United States Patent [19]

Adachi et al.

[11] Patent Number: 4,943,723
[45] Date of Patent: * Jul. 24, 1990

[54] RADIATION IMAGE READ-OUT METHOD

[75] Inventors: Yuuma Adachi; Nobuyoshi Nakajima, both of Kanagawa, Japan

[73] Assignee: Fuji Photo Film Co., Ltd., Kanagawa, Japan

[ * ] Notice: The portion of the term of this patent subsequent to Aug. 29, 2006 has been disclaimed.

[21] Appl. No.: 217,022

[22] Filed: Jul. 11, 1988

Related U.S. Application Data

[63] Continuation of Ser. No. 776,185, Sep. 13, 1985.

[30] Foreign Application Priority Data

Sep. 13, 1984 [JP] Japan .................................. 59-192097

[51] Int. Cl.$^5$ .............................................. G03C 5/16
[52] U.S. Cl. ................................ 250/327.2; 250/484.1
[58] Field of Search ............ 250/327.2, 484.1, 327.2 C, 250/327.2 D, 327.2 E, 327.2 G, 484.1 B

[56] References Cited

U.S. PATENT DOCUMENTS 4,356,398 10/1982 Komaki et al. ................ 250/327.2
4,498,006 2/1985 Horikawa et al. ............... 250/327.2

Primary Examiner—Janice A. Howell
Assistant Examiner—Richard Hanig
Attorney, Agent, or Firm—Sughrue, Mion, Zinn, Macpeak & Seas

[57] ABSTRACT

In a radiation image read-out method wherein preliminary read-out is conducted prior to final read-out for adjusting final read-out conditions and/or image processing conditions for a plurality of stimulable phosphor sheets carrying a radiation image of the same object recorded thereon by combination image recording, the preliminary read-out and the final read-out are conducted only for the first stimulable phosphor sheet which is first subjected to the image read-out, and only the final read-out is conducted for the other stimulable phosphor sheets by use of the read-out conditions and-/or image processing conditions adjusted on the basis of the image input information obtained by the preliminary read-out of the first stimulable phosphor sheet.

3 Claims, 1 Drawing Sheet

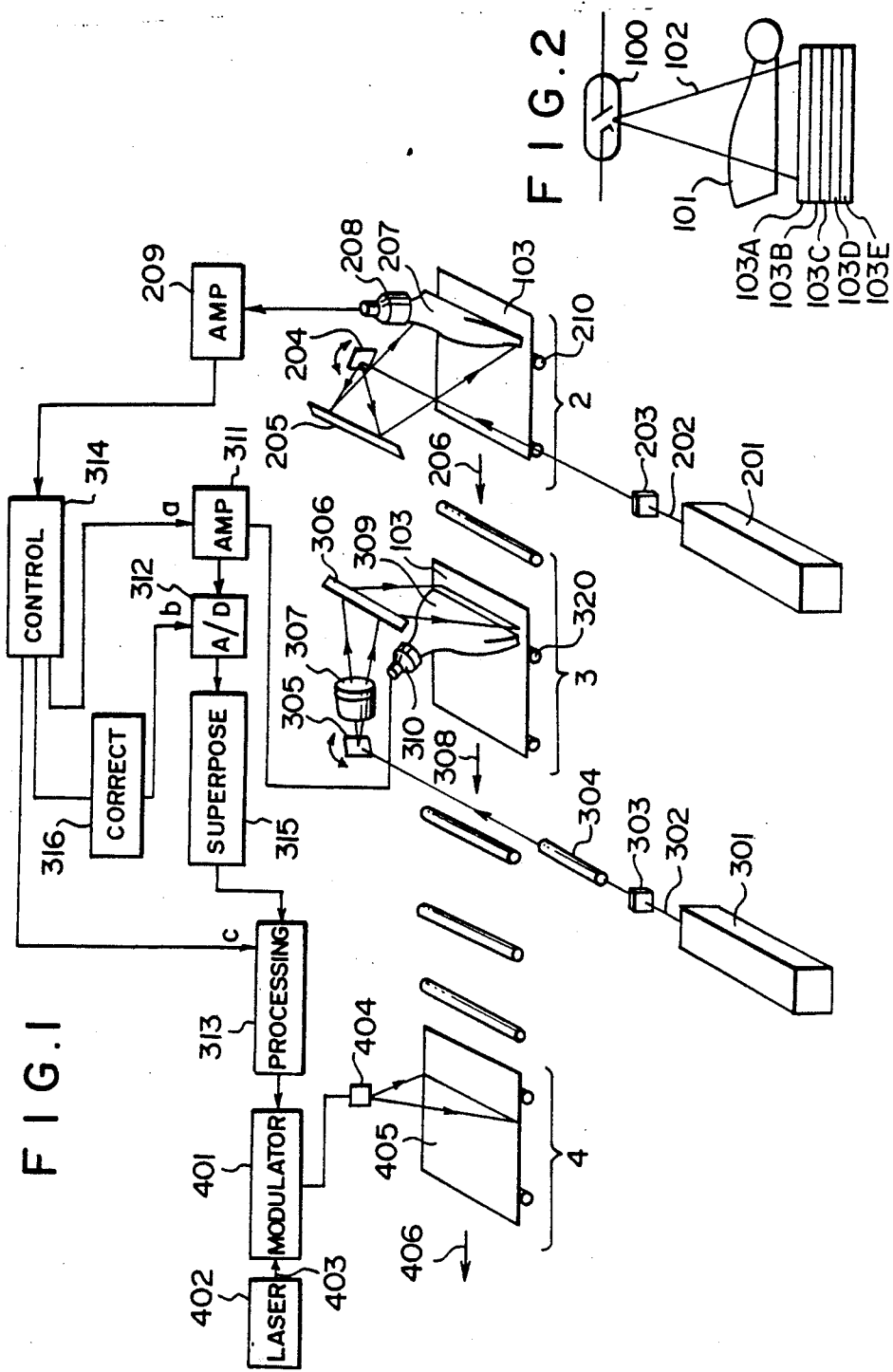

RADIATION IMAGE READ-OUT METHOD

This is a continuation of application Ser. No. 776,185, filed Sept. 13, 1985.

BACKGROUND OF THE INVENTION

1. Field of the Invention

This invention relates to a method of reading out a radiation image stored in a stimulable phosphor sheet by exposing the stimulable phosphor sheet to stimulating rays which cause it to emit light in proportion to the stored radiation energy, and photoelectrically detecting the emitted light. This invention particularly relates to a radiation image read-out method wherein preliminary read-out is conducted for approximately grasping in advance the image input information prior to final read-out for reproducing a visible image.

2. Description of the Prior Art

When certain kinds of phosphors are exposed to a radiation such as X-rays, α-rays, β-rays, ±-rays, cathode rays or ultraviolet rays, they are store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emmit light in the pattern of the stored image. This light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

The radiation image recording and reproducing system using a stimulable phosphor sheet is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy stored in the stimulable phosphor sheet varies over a very wide range in proportion to the amount of said stored energy, it is possible to obtain an image having desirable density regardless of the amount of exposure of the stimulable phosphor to the radiation by reading out the emitted light with an appropriate read-out gain and converting it to an electrical signal to reproduce a visible image on a recording medium or a display device. The electric signal may further be processed as desired to obtain a radiation image suitable for viewing, particularly for diagnostic purposes. This is very advantageous in practical use.

As mentioned above, in the radiation image system using a stimulable phosphor sheet, compensation for deviation of the level of the radiation energy stored in the stimulable phosphor sheet from a desired level can easily be carried out by adjusting the read-out gain to an appropriate value when photoelectrically reading out the light emitted by the stimulable phosphor sheet upon stimulation thereof. Therefore, the quality of the reproduced radiation image is not adversely affected by a fluctuation in radiation dose due to fluctuating tube voltage or MAS value of the radiation source, variation in the sensitivity of the stimulable phosphor sheet or the photodetector, changes in radiation dose resulting from differences in the condition of the object, or differences in radiation transmittance of the object, and the like. Also, it is possible to obtain a desirable radiation image even when the radiation dose to the objects is low. Further, it is possible to obtain a radiation image having a high image quality of high contrast, high sharpness and low noise, and the like, by converting the light emitted from the stimulable phosphor sheet into an electric signal, and processing the electric signal as desired.

However, in order to eliminate various influences caused by variations in radiographic exposure conditions and/or to obtain a radiation image having a high image quality or a high diagnostic efficiency and accuracy, it is necessary to investigate such image input conditions of the radiation image stored in the stimulable phosphor sheet as, for example, the level of radiation dose used for image recording, or the image input pattern which is determined by the portion of the body (e.g. the chest or the abdomen) or the radiographic method used, such as plain image or contrasted image radiographing, before reproducing the radiation image to a visible image, and then to adjust the read-out gain appropriately or to process the electrical signal appropriately based on the detected image input conditions or the image input pattern. The image input conditions and the image input pattern will hereinafter be simply referred to as the image input information when they are referred to generically. It is also necessary to determine the scale factor to optimize the resolution according to the contrast of the image input pattern.

Investigation of the image input information may be conducted prior to the visible image reproduction by use of the method as disclosed in Japanese Unexamined Patent Publication No. 58(1983)-67240. In the method, a read-out operation for detecting the image input information of a radiation image stored in a suitable phosphor sheet (hereinafter referred to as the preliminary read-out) is conducted in advance by use of stimulating rays having stimulation energy of a level lower than the level of the stimulation energy of stimulating rays used in a read-out operation for obtaining a visible image for viewing, particularly for diagnostic purposes (hereinafter referred to as the final read-out), and thereafter the final read-out is carried out. In the final read-out, the read-out gain and/or the scale factor is adjusted to an appropriate value, and/or an appropriate signal processing is conducted, on the basis of the image input information obtained by the preliminary read-out.

As described above, the level of the stimulating rays used in the preliminary read-out is lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by an ND filter, an AOM, or the like, positioned in the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

In the aforesaid method, since the image input condition and the image input pattern of a radiation image stored in the stimulable phosphor sheet can be investigated in advance, it is possible to obtain a radiation image having an improved image quality, particularly a high diagnostic efficiency and accuracy, by adjusting the read-out gain and the scale factor on the basis of the detected image input information without using a read-out system having a wide dynamic range.

However, when the preliminary read-out is conducted in addition to the final read-out, the time required for the radiation image read-out processing becomes longer than when only the final read-out is conducted.

SUMMARY OF THE INVENTION

The primary object of the present invention is to provide a radiation image read-out method which improves the read-out processing speed while maintaining the effects of the preliminary read-out.

Another object of the present invention is to provide a radiation image read-out method wherein the preliminary read-out is omitted when necessary while the effects thereof are maintained.

The present invention is based on the finding that the image input information on stimulable phosphor sheets becomes approximately the same in a combination image recording wherein a plurality of stimulable phosphor sheets are exposed simultaneously or sequentially at short time intervals to a radiation passing through the same object. As the examples of the combination image recording, there may be mentioned angiography wherein the flow of contrast media in the same object is recorded at short time intervals, image recording for superposition processing wherein the radiation image of the same object is recorded on several stimulable phosphor sheets and a read-out image signal for reproducing a visible image is obtained by superposing the image signals detected from the stimulable phosphor sheets, thereby improving the signal-to-noise ratio, as described, for example, in U.S. patent application Ser. No. 168,880, simultaneous multilayer tomography wherein tomographic images of the same object are simultaneously recorded on a plurality of stimulable phosphor sheets as described, for example, in Japanese Patent Publication No. 57(1982)-109637, and high energy image and low energy image recording for energy substraction as described, for example, in Japanese Unexamined Patent Publication No. 59(1984)-83486.

The present invention provides a radiation image read-out method in which the preliminary read-out is conducted, final read-out conditions (such as the read-out gain and scale factor) and/or image processing conditions are adjusted on the basis of image input information obtained by the preliminary read-out, and final read-out is conducted by use of the adjusted read-out conditions, wherein the improvement comprises the steps of:

(i) when the image read-out is conducted for a plurality of the stimulable phosphor sheets carrying a radiation image of the same object recorded thereon by combination image recording, conducting said preliminary read-out and said final read-out only for the first stimulable phosphor sheet which is first subjected to the image read-out, and (ii) conducting only said final read-out for the other stimulable phosphor sheets by use of the read-out conditions and/or image processing conditions adjusted on the basis of the image input information obtained by said preliminary read-out of said first stimulable phosphor sheet.

The present invention also provides a radiation image read-out method comprising the steps of:

(i) when the image read-out is conducted for a plurality of the stimulable phosphor sheets carrying a radiation image of the same object recorded thereon by combination image recording, conducting said preliminary read-out and said final read-out only for the first stimulable phosphor sheet which is first subjected to the image read-out, and (ii) conducting only said final read-out for the other stimulable phosphor sheets by use of corrected conditions obtained by correcting the read-out conditions and/or image processing conditions, which are adjusted on the basis of the image input information obtained by said preliminary read-out of said first stimulable phosphor sheet, and on the basis of a difference in the image input information between said first stimulable phosphor sheet and each of said other stimulable phosphor sheets.

In the radiation image read-out method of the present invention, since the preliminary read-out is omitted when necessary while the effects of the preliminary read-out on improvement of the image quality, particularly the diagnostic efficiency and accuracy, of a reproduced visible image are maintained, it is possible to improve the speed of radiation image read-out processing and to impove the read-out processing capacity of the radiation image read-out apparatus.

BRIEF DESCRIPTION OF THE DRAWINGS

FIG. 1 is a schematic view showing the radiation image read-out and reproducing system wherein an embodiment of the radiation image read-out method in accordance with the present invention is employed, and FIG. 2 is an explanatory view showing an example of the combination image recording.

DESCRIPTION OF THE PREFERRED EBODIMENTS

The present invention will hereinbelow be described in further detail with reference to the accompanying drawings.

FIG. 1 shows the radiation image read-out and reproducing system wherein an embodiment of the radiation image read-out method in accordance with the present invention is employed for detecting radiation images from stimulable phosphor sheets. FIG. 2 shows the combination image recording conducted for recording a radiation image on the stimulable phosphor sheets. The commbination image recording shown in FIG. 2 is conducted for the superposition processing which aims at improving the signal-to-noise ratio as described, for example, in U.S. patent application Ser. No. 168,880. Specifically, stimulable phosphor sheets 103A, 103B, 103C, 103D and 103E superposed one upon another are simultaneously exposed to X-rays 102 emitted by an X-ray source 100 and passing through an object 101 to have an X-ray image of the same object 101 recorded in the same direction on the stimulable phosphor sheets 103A to 103E. After the combination image recording is conducted in this manner, the stimulable phosphor sheets 103A to 103E are sent to the X-ray image read-out step in the radiation image recording and reproducing system shown in FIG. 1. Examples of the stimulable phosphor used in the stimulable phosphor sheets 103A to 103E are described in detail, for example, in U.S. Pat. No. 4,236,078 and European Patent Publication No. 21,342.

Basically, the radiation image read-out and reproducing system shown in FIG. 1 comprises a preliminary read-out section 2, a final read-out section 3 and an image reproducing section 4.

In the preliminary read-out section 2, a laser beam 202 emitted by a laser beam source 201 is first passed through a filter 203 for cutting off the light rays having a wavelength within a range identical with the range of the wavelength of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emitted thereby has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction as indicated by the arrow 206 (i.e. the sub-scanning direction) by a sheet conveying means 210 constituted by conveyor rollers or the like and, thus, the whole surface of the stimulable phosphor sheet 103 is exposed to and scanned by the laser beam 202. The power of the laser beam source 201, the beam diameter of the laser beam 202, the scanning speed of the laser beam 202, and the moving speed of the stimulable phosphor sheet 103 are selected so that the stimulation energy of the laser beam 202 for preliminary read-out is smaller than the stimulation energy of the laser beam for final read-out.

The "stimulation energy" referred to in this invention means the effective energy of the stimulating rays which the stimulable phosphor sheet receives per unit area.

As the ratio of the stimulation energy of the stimulating rays in the preliminary read-out to the stimulation energy of the stimulating rays in the final read-out increases, the amount of radiation energy remaining in the stimulable phosphor sheet after the preliminary read-out decreases. It has been found that, when the aforesaid ratio is smaller than one, it is possible to obtain a radiation image suitable for viewing, particularly for diagnostic purposes, by adjusting the read-out gain to an appropriate value. However, in order to obtain a radiation image having an improved image quality, particularly a high diagnostic efficiency and accuracy, the aforesaid ratio should preferably be as small as possible insofar as the image input information of the radiation image stored in the stimulable phosphor sheet can be detected sufficiently to permit adjustment of the read-out conditions or the image processing conditions, that is, insofar as the light emitted by the stimulable phosphor sheet in the preliminary read-out can be detected sufficiently for the above-mentioned purposes. Thus, the aforesaid stimulation energy ratio should generally be 50% or less, preferably 10% or less, more preferably 3% or less. The lower limit of this ratio is determined according to the acccuracy of the system for detecting the light emitted by the stimulable phosphor sheet in the preliminary read-out.

When exposed to the laser beam 202 as described above, the stimulable phosphor sheet 103 emits light in proportion to the X-ray energy stored therein, and the emitted light enters a light guide member 207 which may be of a shape and a material as disclosed in U.S. Pat. No. 4,346,295. The light is guided inside of the light guide member 207 through total reflection, emanates from a light output face of the light guide member 207 and received by a photomultiplier 208 acting as the light detection means. The light receiving face of the photomultiplier 208 is closely contacted with a filter for transmitting only light having the wavelength distribution of the light emitted by the stimulable phosphor sheet 103 and cutting off the light having the wavelength distribution of the stimulating rays, so that the photomultiplier 208 can detect only the light emitted by the stimulable phosphor sheet 103 upon stimulation thereof. The light detected by the photomultiplier 208 is converted into an electric signal carrying the image input information. The electric signal is amplified by an amplifier 209, and the signal generated thereby is sent to a control circuit 314 at the final read-out section 3. On the basis of the image input information thus obtained, the contol circuit 314 calculates an amplification degree setting value (a), a scale factor setting value (b) and an image processing conditions setting value (c).

After the preliminary read-out is finished, the stimulable phosphor sheet 103 is sent to the final read-out section 3. At this section, a laser beam 302 emitted by a laser beam source 301 is first passed through a filter 303 for cutting off the light beam having a wavelength within the range identical with the range of the wavelength of the light emitted by the stimulable phosphor sheet 103 upon stimulation thereof by the laser beam 302. Then, the beam diameter of the laser beam 302 is strictly adjusted by a beam expander 304. The laser beam 302 is then deflected by a light deflector 305 formed of a galvanometer mirror of the like, and is made to impinge upon the stimulable phosphor sheet 103 by a plane reflection mirror 306. Between the light deflector 305 and the plane reflection mirror 306 is positioned an f$\theta$ lens 307 for maintaining the beam diameter of the laser beam 302 uniform during the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. sub-scanning direction) by a sheet conveying means 320 constituted by conveyor rollers or the like and, consequently, the whole area of the stimulable phosphor sheet 103 is exposed to and scanned by the laser beam 302. Upon exposure to the laser beam 302, the stimulable phosphor sheet 103 emits light in proportion to the X-ray energy stored therein, and the light emitted enters a light guide member 309 which is made of the same material and has the same configuration as those of the light guide member 207 used for the preliminary read-out. The light emitted by the stimulable phosphor sheet 103 is guided inside of the light guide member 309 through total reflection, emanates from the light output face of the light guide member 309 and received by a photodetector 310 constituted by a photomultiplier or the like. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The light emitted by the stimulable phosphor sheet 103 and detected by the photodetector 310 in the final read-out is converted into an electrical signal, amplified to an appropriate level by an amplifier 311 the sensitivity of which has been adjusted by the amplification degree setting value (a), and then sent to an A/D converter 312. In the A/D converter 312, the electric signal is converted into a digital signal by use of a scale factor which has been set by the scale factor setting value (b) to suit the width of signal fluctuation. The digital signal thus obtained is sent to a superposition processing circuit 315 which has a storage means for storing the read-out image signals detected from the stimulable phosphor sheets 103A to 103E and conducts an electric addition processing of the read-out image signals after the final read-out of all of the stimulable phosphor sheet 103A to 103E is finished. An image signal obtained by the addition processing gives a signal-to-noise ratio higher than in the original read-out image signal obtained from each of the stimulable phosphor sheets 103A to 103E. Then, the digital signal obtained by the superposition processing is sent to a signal processing circuit 313, in which it is processed on the basis of the image processing condition setting value (c) so as to obtain a radiation image suitable for viewing, particularly for diagnostic purposes. The electric image signal obtained by the signal processing circuit 313 is sent to a light modulator 401 at the image reproducing section 4. As for the signal processing, it is possible to employ frequency processing as disclosed in U.S. Pat. Nos. 4,315,318, 4,346,295 or 4,387,428, or European Patent Publication No. 31,952, and gradation processing as disclosed in U.S. Pat. Nos. 4,302,672, 4,276,473 or 4,310,886.

In the image reproducing section 4, a laser beam 403 emitted by a reproducing laser beam source 402 is modulated by the light modulator 401 on the basis of the electric image signal fed by the signal processing circuit 313, and is made to impinge upon a photosensitive material 405 such as photographic film by a scanning mirror 404 for scanning the photosensitive material 405 by the laser beam 403. At this time, the photosensitive material 405 is moved normal to the scanning direction, i.e. in the direction as indicated by the arrow 406. Accordingly, the radiation image is recorded in the photosensitive material 405. For reproducing the radiation image, it is also possibel to use any other method. For example, the final signal obtained at the final read-out section 3 may be electronically displayed on a display device such as a CRT, or the final radiation image may be recorded by use of a video tape recorder or a printer. Alternatively, the radiation image may be reproduced in a thermosensitive recording material by use of heat waves.

In the embodiment of the present invention, as the amplification degree setting value (a), the scale factor setting value (b) and the image processing condition setting value (c) for the second stimulable phosphor sheet 103B and the subsequent stimulable phosphor sheets 103C, 103D and 103E, the values adjusted by the preliminary read-out for the stimulable phosphor sheet 103A positioned as the first layer at the time of the X-ray image recording and first subjected to the image read-out are utilized. Thus the preliminary read-out is not conducted for the stimulable phosphor sheets 103B to 103E. In this case, for the scale factor (latitude), the scale factor setting value (b) is used as such. As for the read-out gain (sensitivity), a value obtained by correcting the amplification degree setting value (a) by a correction circuit 316 is used. Thus in order to conduct the superposition processing as described above, the same scale factor should preferably be used for all of the stimulable phosphor sheets 103A to 103E. On the other hand, in the combination image recording shown in FIG. 2, X-rays to which the stimulable phosphor sheets 103A to 103E are exposed decay as the X-rays pass therethrough. Therefore, for the stimulable phosphor sheets 103B to 103E, the decay amount with respect to the amount of X-rays to which the first stimulable phosphor sheet 103A is exposed is calculated, and the amplification degree setting value (a) is corrected on the basis of the decay amount. When the sensitivity is different between the stimulable phosphor sheets, for example, when the thickness is different therebetween, the read-out gain is corrected also by considering the difference in sensitivity. The difference in sensitivity between the stimulable phosphor sheets, i.e. the difference between the stimulable phosphor sheets, may be detected by use of bar codes or the like. The X-ray decay amount may be calculated from the tube voltage of the X-ray source 100 and the X-ray absorption characteristics of the stimulable phosphor sheets 103A to 103E.

When the preliminary read-out is omitted for the second stimulable phosphor sheet 103B and the subsequent stimulable phosphor sheets 103C, 103D and 103E as described above, it is possible to increase the speed of image read-out processing. For stimulable phosphor sheets other than the stimulable phosphor sheets 103A to 103E subjected to the combination image recording, the preliminary read-out and the final read-out are conducted.

In the case of the combination image recording for the superposition processing, when the number of stimulable phosphor sheets subjected to the combination image recording is small and the amount of the radiation reaching the stimulable phosphor sheet is not so much different between the stimulable phosphor sheets, the amplification degree setting value (a) may not be corrected, and the amplification degree setting value (a) adjusted on the basis of the image input information obtained by the preliminary read-out of the first stimulable phosphor sheet may be used directly in the final read-out of the second stimulable phosphor sheet and subsequent sheets.

In the aforesaid embodiment, only the signal obtained by the superposition processing is output. When the respective image signals detected from the stimulable phosphor sheets 103A to 103E are also output, since the X-ray amount reaching the stimulable phosphor sheets decreases as the X-rays pass therethrough, the image processing conditions may be corrected as described in Japanese Patent Application No. 59(1984)-43528.

The radiation image read-out method of the present invention is also applicable to the case of combination image recording such as angiography, simultaneous multilayer tomography, and high energy image and low energy image recording for energy subtraction.

In angiography, the flow of contrast media in the same object is recorded at a recording speed of two or three images per second. In this case, the image recording direction of the object and the image recording conditions are the same. Therefore, after the amplification degree setting value (a), the scale factor setting value (b) and the image processing condition setting value (c) for the final read-out are adjusted for the stimulable phosphor sheet subjected first to the image recording (i.e. the sheet carrying a mask image prior to injection of contrast media recorded thereon) by conducting the preliminary read-out, only the final read-out may be conducted for the second stimulable phosphor sheet and subsequent sheets (i.e. the sheets carrying a live image after injection of the contrast media recorded thereon) by use of the same values (a), (b) and (c). That is, in this case since the image recording conditions are the same for all of the stimulable phosphor sheets, it is not necessary to correct the amplification degree setting value (a), the scale factor setting value (b) and the image processing condition setting value (c). However, when there is a difference is sensitivity between the stimulable phosphor sheets, it is necessary to detect the difference by use of bar codes or the like and to correct the amplification degree setting value (a).

In simultaneous multilayer tomography using stimulable phosphor sheets, a stack of a plurality of stimulable phosphor sheets and a radiation source are positioned with an object intervening therebetween, the radiation source and the stimulable phosphor sheets are moved with respect to each other around each of the tomographic planes of the object so as to satisfy the linear rule (defined as that the focal point of the radiation source, one point on the tomographic plane and one point on the stimulable phosphor sheet align) and the geometric rule (defined as that the ratio of the distance between the focal point and the tomographic plane to the distance between the tomographic plane and the stimulable phosphor sheet is constant), so that only the image of each tomographic plane is formed on each stimulable phosphor sheet, as described, for example, in Japanese Patent Application No. 57(1982)-109637. In simultaneous multilayer tomography, since the amount of the low energy component of X-rays reaching a lower stimulable phosphor sheet of the sheet stack (i.e. the sheet farther from the radiation source) becomes smaller than that reacting an upper stimulable phosphor sheet, the latitude must be adjusted to be narrower for the lower sheet and the sensitivity must be increased therefor. Therefore, the amplification degree setting value (a) and the scale factor setting value (b) adjusted on the basis of the image input information obtained by the preliminary read-out of the first (uppermost) stimulable phosphor sheet should preferably be corrected as described above and then used in the final read-out of the second and subsequent stimulable phosphor sheets. In this case, correcting conditions may be adjusted on the basis of the tube voltage, differences in radiation absorption characteristics and sensitivity between the stimulable phosphor sheets.

Also, in this case, the image processing condition setting value (c) may be corrected in accordance with the amplification degree setting value (a) and the scale factor setting value (b) as described in Japanese Patent Application Nos. 59(1984)-7668 and 59(1984)-43528.

In combination image recording wherein a high energy image and a low energy image for energy subtraction are recorded in one shot by use of a stack of stimulable phosphor sheets as described in Japanese Unexamined Patent Publication No. 59(1984)-83486, the latitude becomes wider for the low energy image. Therefore, when reading out the radiation images from the stimulable phosphor sheets carrying the high energy image and the low energy image stored therein, the low energy image of a wider latitude should first be read out. In this case, it becomes possible to conduct the final read-out of the high energy image by directly using the latitude factor of the low energy image. However, the amount of the low energy component of the radiation reaching the lower stimulable phosphor sheet for recording the high energy image becomes small due to a filter for absorbing the low energy component of the radiation positioned between the stimulable phosphor sheets at the time of image recording. Therefore, when image read-out from the lower stimulable phosphor sheet carrying the high energy image stored therein is conducted, the sensitivity and latitude factors adjusted on the basis of the preliminary read-out of the upper stimulable phosphor sheet carrying the low energy image should preferably be corrected to higher sensitivity and narrower latitude. Particularly, the sensitivity factor should always be corrected. The image processing condition setting value (c) need not necessarily be corrected. Also, when the thickness of the upper stimulable phosphor sheet for recording the low energy image is adjusted to be smaller and the thickness of the lower sheet for recording the high energy image is adjusted to be larger by considering the passing radiation dose, the difference between the sheets is detected by use of bar codes or the like and the amplification degree setting value (a) is corrected.

As described, for example, in Japanese Unexamined Patent Publication No. 58(1983)-67242, single read-out system may be used for the preliminary read-out and the final read-out. In this case, after the preliminary read-out is finished, the stimulable phosphor sheet is returned to the read-out system by a sheet conveying means and the final read-out is conducted. At the preliminary read-out step, the energy of stimulating rays is adjusted to be lower than the energy of stimulating rays used in the final read-out. The present invention is also application to such a case.

We claim:

1. A radiation image read-out method in which, prior to final read-out for exposing a stimulable phosphor sheet carrying a radiation image of an object stored therein to stimulating rays which cause the stimulable phosphor sheet to emit light in proportion to the stored radiation energy, detecting the emitted light by use of a photoelectric read-out means to obtain an electric image signal for reproducing a visible image, preliminary read-out is conducted by use of stimulating rays of a level lower than the level of stimulating rays used in the final read-out, read-out conditions in the final read-out and/or image processing conditions are adjusted on the basis of image input information on the stimulable phosphor sheet obtained by the preliminary read-out, and the final read-out is conducted by use of the adjusted conditions, wherein the improvement comprises the steps of:

(i) when the image read-out is conducted for a plurality of the stimulable phosphor sheets carrying a radiation image of the same object recorded thereon by combination image recording, conducting said preliminary read-out and said final read-out only for the first stimulable phosphor sheet which is first subjected to the image read-out, and (ii) conducting only said final read-out for the other stimulable phosphor sheets by use of the read-out conditions and/or image processing conditions adjusted on the basis of the image input information obtained by said preliminary read-out of said first stimulable phosphor sheet.

2. A method as defined in claim 1 wherein said combination image recording is conducted for a superposition processing.

3. A method as defined in claim 1 wherein said combination image recording is angiography.

* * * * *